US011598625B2

(12) United States Patent
Chen et al.

(10) Patent No.: US 11,598,625 B2
(45) Date of Patent: Mar. 7, 2023

(54) APPARATUS AND METHOD FOR DEFORMATION MEASUREMENT

(71) Applicant: Advanced Semiconductor Engineering, Inc., Kaohsiung (TW)

(72) Inventors: Hsuan-Yu Chen, Kaohsiung (TW); Ming-Han Wang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 208 days.

(21) Appl. No.: 17/008,333

(22) Filed: Aug. 31, 2020

(65) Prior Publication Data

US 2022/0065608 A1    Mar. 3, 2022

(51) Int. Cl.
*G01B 7/16* (2006.01)
*G01N 1/44* (2006.01)

(52) U.S. Cl.
CPC ............. *G01B 7/16* (2013.01); *G01N 1/44* (2013.01)

(58) Field of Classification Search
CPC ............ G01B 7/16; G01B 11/16; G01N 1/44; G01N 21/8851; G01N 2203/0057; G01N 3/60
See application file for complete search history.

(56) References Cited

U.S. PATENT DOCUMENTS

| 3,627,989 | A | * | 12/1971 | Heidler | ................ | H05B 3/0057 |
| | | | | | | 219/544 |
| 10,852,118 | B2 | * | 12/2020 | Meyer | ....................... | G01B 5/30 |
| 2006/0037406 | A1 | * | 2/2006 | Dharia | ..................... | G01N 3/04 |
| | | | | | | 425/149 |
| 2016/0302759 | A1 | * | 10/2016 | Shi | ........................... | A61B 8/52 |
| 2020/0234427 | A1 | * | 7/2020 | Cui | ....................... | G06F 30/398 |
| 2021/0123722 | A1 | * | 4/2021 | Vernhes | ............. | G01B 11/2518 |

\* cited by examiner

*Primary Examiner* — Alexander A Mercado
*Assistant Examiner* — John M Royston
(74) *Attorney, Agent, or Firm* — Foley & Lardner LLP

(57) ABSTRACT

An apparatus for deformation measurement and a method for deformation measurement are provided. The apparatus includes a housing, a sample holder, a moving mechanism, a first heating device and a second heating device. The sample holder is in the housing. The moving mechanism is over the sample holder. The first heating device is on the moving mechanism. The second heating device is below the sample holder.

18 Claims, 7 Drawing Sheets

US 11,598,625 B2

APPARATUS AND METHOD FOR DEFORMATION MEASUREMENT

BACKGROUND

1. Technical Field

The present disclosure relates generally to an apparatus and a method for deformation measurement. More particularly, the present disclosure relates to an apparatus and a method for deformation measurement including a heating device.

2. Description of the Related Art

Along with the increasing technical advance and user requirements of smart mobile devices, the functions of smart mobile devices are increased, and thus the importance of IC integration is increased accordingly. In the meantime, the integration of heterogeneous materials is increasingly difficult and complicated. Deformation and/or warpage of device structures may easily occur during the manufacturing processes.

Therefore, semiconductor device package(s) may undergo certain reliability tests. For example, a semiconductor device package may be placed in a temperature-variable container (e.g. an oven) for subsequent observation. An optical device (e.g. a digital image correlation (DIC) device) may be used to obtain images of the semiconductor device package during thermal cycles. The temperature-variable container may be equipped with a transparent plate or a window to facilitate taking images of the semiconductor device package.

SUMMARY

In one or more embodiments, an apparatus for deformation measurement includes a housing, a sample holder, a moving mechanism, a first heating device and a second heating device. The sample holder is in the housing. The moving mechanism is over the sample holder. The first heating device is on the moving mechanism. The second heating device is below the sample holder.

In one or more embodiments, an apparatus for deformation measurement includes a housing, a sample holder, a first heating device, a cooling device and a moving mechanism. The sample holder is in the housing. The first heating device is over the sample holder. The cooling device is over the sample holder. The cooling device includes an outlet and a collecting mechanism. The outlet is configured to provide liquid nitrogen into the housing. The collecting mechanism is directly below the outlet. The collecting mechanism is configured to collect the liquid nitrogen from the outlet and allow nitrogen vapor filling the housing. The moving mechanism is coupled to the cooling device and the first heating device.

In one or more embodiments, a method for deformation measurement includes placing a sample on a sample holder in a housing and heating the sample with a first heating device over the sample holder and a second heating device below the sample holder until a temperature of the sample reaches a predetermined value. The method also includes temporarily removing the first heating device from projecting over the sample. The method further includes performing a first measurement to a deformation of the sample by an image sensor outside the housing. The temperature of the sample is maintained substantially equal to the predetermined value by the second heating device during the first measurement.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
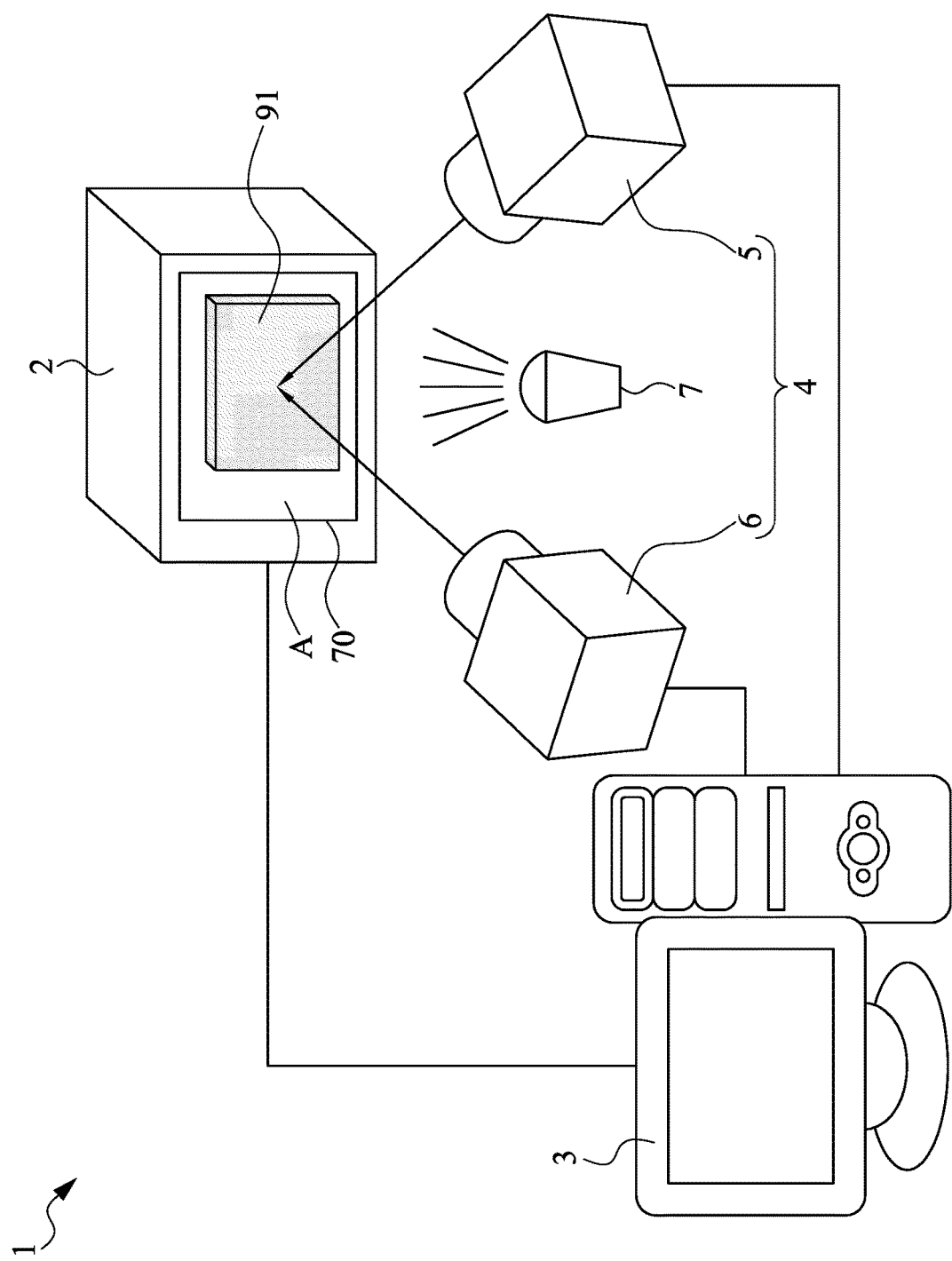
FIG. 1 illustrates a schematic diagram of a measuring system in accordance with some embodiments of the present disclosure.

FIG. 1 illustrates a schematic diagram of a measuring system 1 in accordance with some embodiments of the present disclosure. The measuring system 1 includes an apparatus 2 for deformation measurement, a computer 3, and an optical device 4.

The apparatus 2 defines a space A for accommodating a sample 91 to be measured. The optical device 4 may include an optical sensor unit 5 and an optical sensor unit 6. In some embodiments, the optical device 4 may include two or more optical sensor units 5 and two or more optical sensor units 6. In some embodiments, the apparatus 2 may include one or more light sources 7. In some embodiments, the optical sensor unit(s) 5 may be arranged with one light source 7, and the optical sensor unit(s) 6 may be arranged with one light source 7. The light source 7 emits light towards the sample 91. In some embodiments, the sample 91 may be or include, for example, a wafer, a chip or a die. In some embodiments, the optical sensor unit 5 and the optical sensor unit are image sensors. In some embodiments, the optical sensor unit 5 is a local camera, and the optical sensor unit 6 is a global camera. In some embodiments, the optical sensor unit 5 captures a plurality of local images of a plurality of local areas of the sample 91, and the optical sensor unit 6 captures a global image of the sample 91 (e.g. of an entire surface of the sample 91). The global image and the local images can be captured and transmitted to the computer 3. The global image and the local images can be processed and calculated by the computer 3 to obtain the images of the sample 91 (including, for example, image deviation, distortion, and so forth). In some embodiments, the computer 3 may be a control unit including a processor and an associated memory. The computer 3 may be connected to the apparatus 2, the optical device 4, heating devices (not illustrated in FIG. 1) and a cooling device (not illustrated in FIG. 1) to direct operation of these components. In contrast to a single image detecting device, the local and global images captured by two different optical sensor units 5 and 6 can provide an improved stereoscopic view (including in-plane deformation, distortion and warpage of the sample 91).

Figure 2:
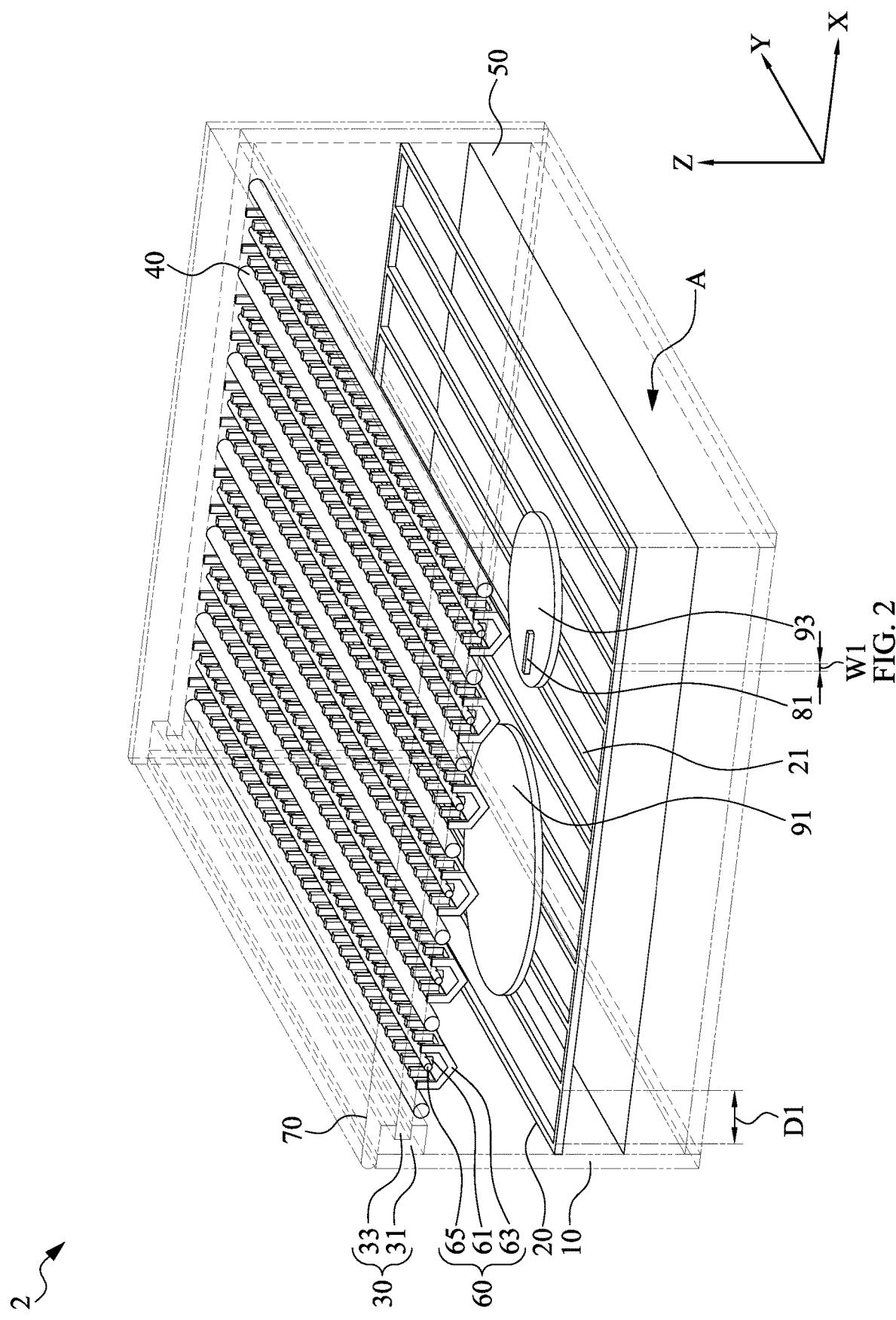
FIG. 2 illustrates a perspective view of an apparatus for deformation measurement in accordance with some embodiments of the present disclosure.

FIG. 2 illustrates a perspective view of an apparatus 2 for deformation measurement in accordance with some embodiments of the present disclosure. The apparatus 2 includes a housing 10, a sample holder 20, a moving mechanism 30, heating devices 40 and 50, a cooling device 60, a cover 70, and at least a temperature sensor 81.

The housing 10 defines a space A for accommodating a sample 91 to be measured. In some embodiments, the housing 10 is made of or includes a hard retardation material. In some embodiments, the housing 10 is non-transparent to a peak wavelength emitted or to be received by an image sensor (e.g., the optical sensor units 5 and/or 6) outside the housing 10.

The sample holder 20 is in the housing 10. In some embodiments, the sample holder 20 includes a plurality of bars 21. In some embodiments, the bars 21 are arranged in parallel and configured to carry a sample (e.g., the sample 91). In some embodiments, a distance D1 between the adjacent bars 21 is greater than a width W1 of each of the bars 21. In some embodiments, the bars 21 are made of or include steel. In some embodiments, a ratio (W1/D2) of the width W1 to the distance D1 may be greater than about 10. In some embodiments, a ratio (W1/D2) of the width W1 to the distance D1 may be greater than about 20.

The moving mechanism 30 is over the sample holder 20. In some embodiments, the moving mechanism 30 includes a sliding rail 31 attached to the housing 10. In some embodiments, the moving mechanism 3 further includes a support structure 33 movably connected to the sliding rail 31. In some embodiments, a length of the sliding rail 31 is greater than a length of the support structure 33 along the moving direction (e.g., the y-direction), such that the support structure 33 can be moved towards outside the measurement window (details of which will be discussed hereinafter). In some embodiments, the support structure 33 is or includes a heat retardation plate. In some embodiments, the support structure 33 is or includes a ceramic plate.

The heating device 40 is over the sample holder 20. In some embodiments, the heating device 40 is on the moving mechanism 30. In some embodiments, the heating device 40 heats the sample 91 through infrared radiation or by thermal conductance through air. In some embodiments, the heating device 40 includes a plurality of heating tubes. In some embodiments, the heating device 40 includes a plurality of quartz tubes. In some other embodiments, the heating device 40 is or includes or a heating plate (not illustrated in FIG. 2). In some embodiments, the heating device 40 is coupled to the sliding rail 31 of the moving mechanism 30. In some embodiments, the heating device 40 is disposed on the support structure 33 to be movably coupled to the sliding rail 31. In some embodiments, the heating device 40 is between the sample holder 20 and a heat retardation plate (e.g., the support structure 33). Accordingly, the heat retardation plate can prevent heat loss during the heating operation of the heating device 40, and after a predetermined temperature within the housing 10 is reached, the heating device 40 can be removed from projecting over the sample 91, so that the optical sensor units 5 and 6 can capture images of the sample 91.

In the cases when an air ventilation unit is used as a heating device in a temperature-variable container for deformation measurement, the air ventilation unit purges heated air into the temperature-variable container. Since the temperature-variable container is heated by the flows of heated air through air convection, the heating rate of the temperature-variable container is relatively low, and the uniformity of thermal distribution inside the temperature-variable container is relatively poor. For example, a first portion of the sample to be tested is proximal to the air ventilation unit, and a second portion, which is opposite to the first portion, of the sample to be tested is away from the air ventilation unit. A temperature gradient between the first portion and the second portion can unduly deteriorate the precision of measurement result since the sample to be tested possesses a non-uniform temperature distribution.

According to some embodiments of the present disclosure, the heating device 40 including heating tubes can heat the sample 91 through infrared radiation, such that the uniformity of thermal distribution within the housing 10 can be improved. Since the heating device 40, such as heating tubes or quartz tubes, transfer heat through thermal radiation, which demonstrates a relatively higher heating rate than the conventional air ventilation unit, which transfers heat through thermal convection. Implementation of the heating tubes or quartz tubes can simulate extreme environmental condition such desert for deformation measurements. For example, the temperature within the housing 10 can reach about 300° C., and the heating rate can reach about 30° C./min.

The heating device 50 is below the sample holder 20. In some embodiments, the sample holder 20 is spaced apart from the heating device 50. In some embodiments, the heating device 50 is or includes a heating plate. In some embodiments, the bars 21 of the sample holder 20 are arranged in parallel and spaced apart from the heating plate (e.g., the heating device 50). In some embodiments, the bars 21 of the sample holder 20 are arranged in parallel and configured to carry a sample (e.g., the sample 91) and expose a portion of the sample to the heating device 50.

According to some embodiments of the present disclosure, the heating device 50 including a heating plate can heat the sample 91 by thermal conductance through air and thus can increase the uniformity of temperature distribution within the housing 10. In addition, the heating device 50 can be a heating plate rather than heating tubes (e.g., quartz tubes), since the heating device 50 remains turned-on and is disposed under the sample 91 when a measurement is being performed, the reflections from the quartz tubes may adversely affect the detection performed by the optical sensor units 5 and 6, and the temperature around the sample 91 may undesirably decrease if the heating device 50 is turned off to avoid the aforesaid reflections.

Moreover, the heating device 40 and the heating device 50 heat the sample 91 from two opposite sides by thermal conductance through air or thermal radiation, such that the uniformity of temperature distribution around the sample 91 can be significantly improved. Furthermore, since the heating rate and the uniformity of temperature distribution are both increased, the size of the sample 91 to be measured can be increased, for example, from about 300*300 mm to about 600*600 mm. Accordingly, the measurement range of the apparatus 2 can be greatly increased, for example, field of view (FOV) of the optical sensor unit 6 (i.e., global camera) can reach about 63 μm, such that the applications of the apparatus 2 can be increased.

Furthermore, the bars 21 of the sample holder 20 disposed below the sample 91 can allow the heat provided from the heating device 50 to directly transmit through the gaps between the bars 21 and reach the sample 91, thus the heating rate can be increased. In addition, the bars 21 of the sample holder 20 disposed below the sample 91 can prevent undesired accumulation of heat on the bottom surface of the sample 91, which is advantageous to heat dissipation. Therefore, the uniformity of thermal distribution around the sample 91 can be improved, and possible damages to the sample 91 by accumulated heat can be avoided.

The cooling device 60 is over the sample holder 20. In some embodiments, the cooling device 60 is disposed over the sample holder 20 for providing liquid nitrogen to fill in the housing 10. In some embodiments, the bars 21 of the sample holder 20 expose a portion of the sample 91 to the nitrogen. In some embodiments, the cooling device 60 includes an outlet 61 and a collecting mechanism 63, and the outlet 61 is configured to provide liquid nitrogen into the housing 10. In some embodiments, the collecting mechanism 63 is directly below the outlet 61 and configured to collect the liquid nitrogen from the outlet 61 and allow liquid nitrogen to vaporize and filling the housing 10 with cool nitrogen gas. In some embodiments, the cooling device 60 includes a plurality of tubes 65, and each of the tubes 65 includes a plurality of the outlets 61. In some embodiments, the outlets 61 are disposed between the quartz tubes of the heating device 40.

In the cases when an air ventilation unit is used as a cooling device in a temperature-variable container for deformation measurement, the air ventilation unit purges cooled air to flow through inside the temperature-variable container. Since the temperature-variable container is cooled by the flows of cooled air, the cooling rate of the temperature-variable container is relatively low. In addition, since the lowest temperature of the cooled air is normally higher than 0° C., the lowest temperature that can be achieved within the temperature-variable container is limited.

According to some embodiments of the present disclosure, liquid nitrogen can be provided with a relatively great amount or a relatively high flow rate from the outlet 61 directly flowing into the collecting mechanism 63 and then turning into cooled nitrogen vapor to fill in the housing 10, thus liquid nitrogen as well as its vapor can provide a relatively low temperature and a relatively fast cooling rate. For example, the temperature within the housing 10 can reach about −65° C., and the cooling rate can reach about 30° C./min. In addition, with the collecting mechanism 63, liquid nitrogen is first vaporized to become cool nitrogen gas and then cool down the sample rather than directly contact the sample 91 with liquid phase. Furthermore, with the heating device 40 positioned over the sample 91, the heating device 50 positioned under the sample 91, and the cooling device 60, the temperature variation range within the housing 10 can be relatively large, for example, the temperature variation may range from about −65° C. to about 300° C. Implementation of the cooling device 60 can simulate extreme environmental condition such polar region for deformation measurements.

Moreover, the bars 21 of the sample holder 20 disposed below the sample 91 can allow the cooled nitrogen vapor to flow through the gaps between the bars 21 and reach the other side (e.g., the bottom surface) of the sample 91. In addition, the bars 21 are made of or include steel. Therefore, the cooling rate and the cooling uniformity are both improved.

In some embodiments, the moving mechanism 30 is coupled to the cooling device 60. In some embodiments, the cooling device 60 is coupled to the sliding rail 31 of the moving mechanism 30. In some embodiments, the cooling device 60 is disposed on the support structure 33 to be movably coupled to the sliding rail 31. In some embodiments, the cooling device 60 is between the sample holder 20 and a heat retardation plate (e.g., the support structure 33). In some embodiments, the moving mechanism 30 is coupled to both of the cooling device 60 and the heating device 40. Accordingly, the heating device 40 and the cooling device 60 can be removed from projecting over the sample 91 together with the support structure 33 simultaneously right before performing the deformation measurement by image sensors.

The cover 70 is disposed over the sample holder 20. In some embodiments, the cover 70 is disposed over the moving mechanism 30. In some embodiments, the cover 70 is transparent to a peak wavelength emitted or to be received by an image sensor (e.g., the optical sensor units 5 and/or 6 shown in FIG. 1) outside the housing 10. In some embodiments, the cover 70 is made of or includes glass. In some embodiments, the cover 70 is affixed to the housing 10. In some embodiments, the cover 70 is connected to a portion of an upper surface of the housing 10. In some embodiments, the size of the cover 70 may vary according to actual measurement needs, and is not limited to necessarily fully cover the whole space A. In some embodiments, the cover 70 may cover a portion of the space A from above, and another portion of the space A is covered by the housing 10. According to some embodiments of the present disclosure, the heat retardation plate (e.g., the support structure 33) is disposed between the cover 70 and the heating device 40, such that the cover 70 can be prevented from deformation caused by heat from the heating device 40, and thus light emitted or to be received by an image sensor (e.g., the optical sensor units 5 and/or 6) outside the housing 10 is not undesirably refracted by deformation of the cover 70.

The temperature sensor 81 is disposed adjacent to the sample holder 20 and configured to control the heating device 40 and/or the heating device 50. In some embodiments, the temperature sensor 81 is configured to be disposed on a dummy sample 93 proximal to the sample 91 to be measured. In some embodiments, the temperature sensor 81 is disposed on a top surface of the dummy sample 93 facing the heating device 40, and the temperature sensor 81 is configured to control a temperature of the heating device 40. In some embodiments, the apparatus 2 may further include a temperature sensor (not illustrated in FIG. 1) disposed on a bottom surface of the dummy sample 93 facing the heating device 50.

Figure 3:
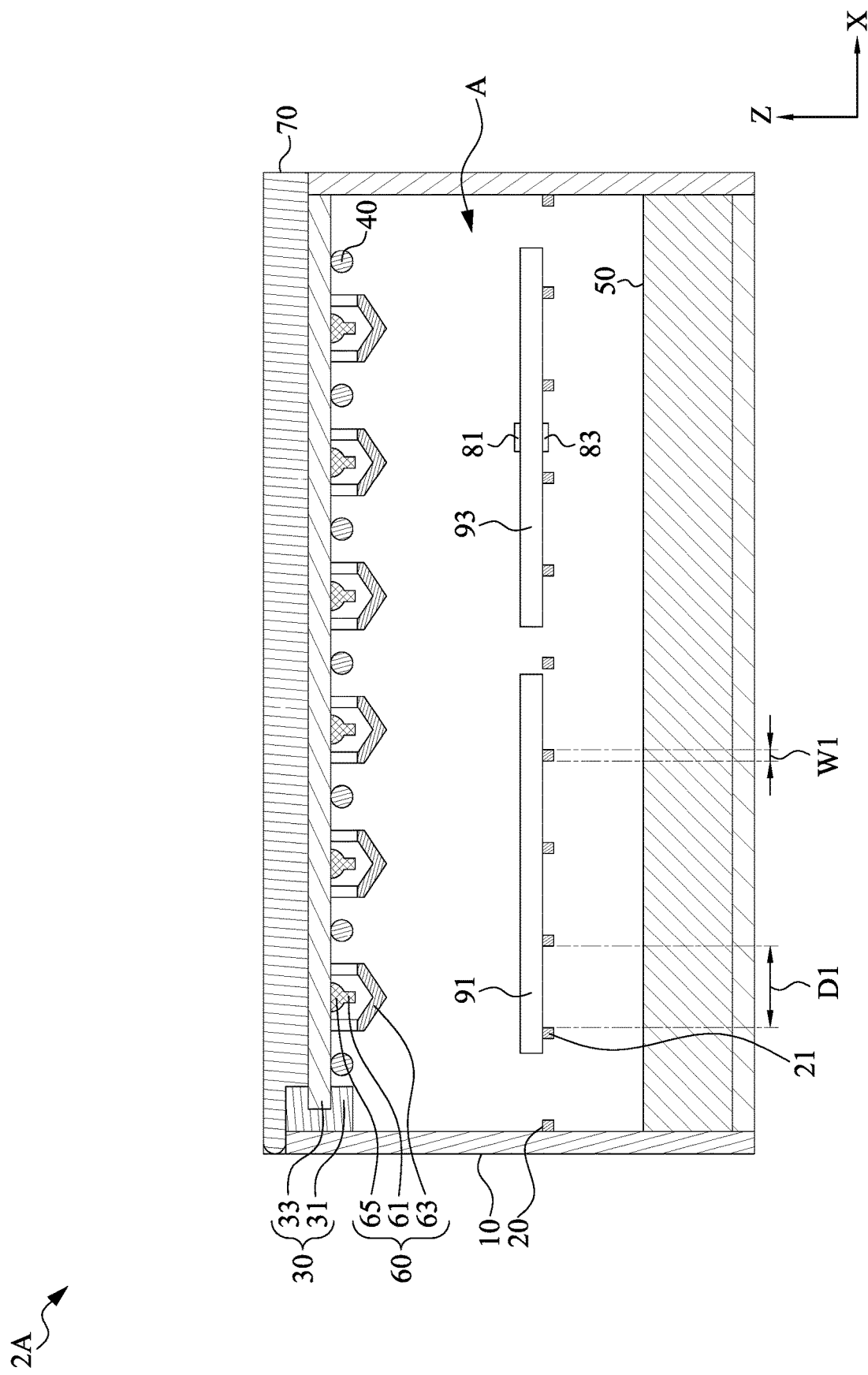
FIG. 3 illustrates a cross-sectional view of an apparatus for deformation measurement in accordance with some embodiments of the present disclosure.

FIG. 3 illustrates a cross-sectional view of an apparatus 2A for deformation measurement in accordance with some embodiments of the present disclosure. In some embodiments, FIG. 3 represents a cross-sectional view along x-direction of the structure in FIG. 2.

In some embodiments, the apparatus 2A may include temperature sensors 81 and 83. In some embodiments, the temperature sensor 81 is disposed on a top surface of the dummy sample 93 facing the heating device 40, and the temperature sensor 81 is configured to control a temperature of the heating device 40. In some embodiments, the temperature sensor 83 is disposed on a bottom surface of the dummy sample 93 facing the second heating device 50, and the temperature sensor 83 is configured to control a temperature of the heating device 50. With the temperature sensors 81 and 83 controlling the temperatures of the heating devices 40 and 50, the uniformity of thermal distribution within the housing 10 can be significantly improved.

Figure 4A:
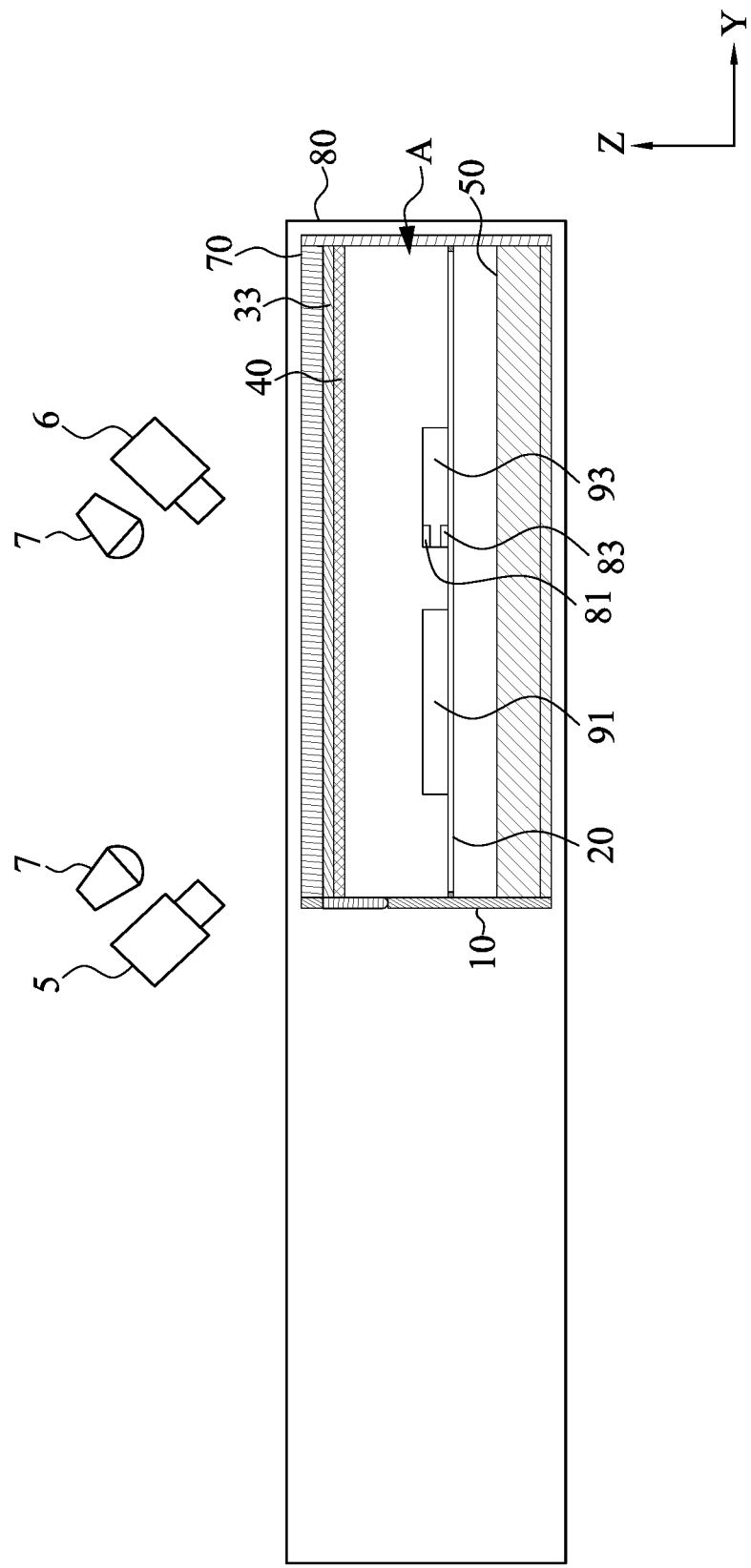
FIG. 4A, FIG. 4B, FIG. 5A and FIG. 5B illustrate various operations in a method for deformation measurement in accordance with some embodiments of the present disclosure.
Figure 4B:
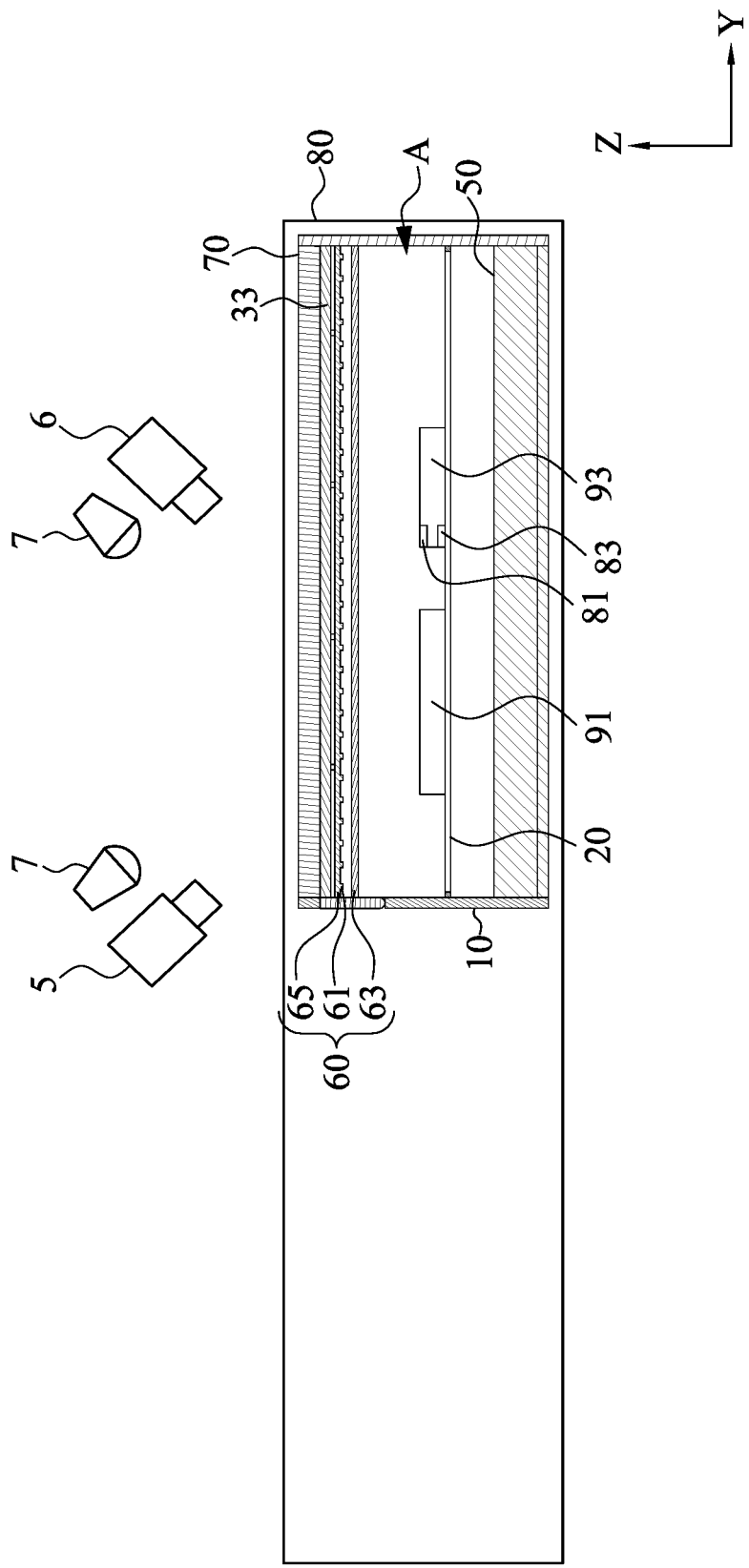
Figure 5A:
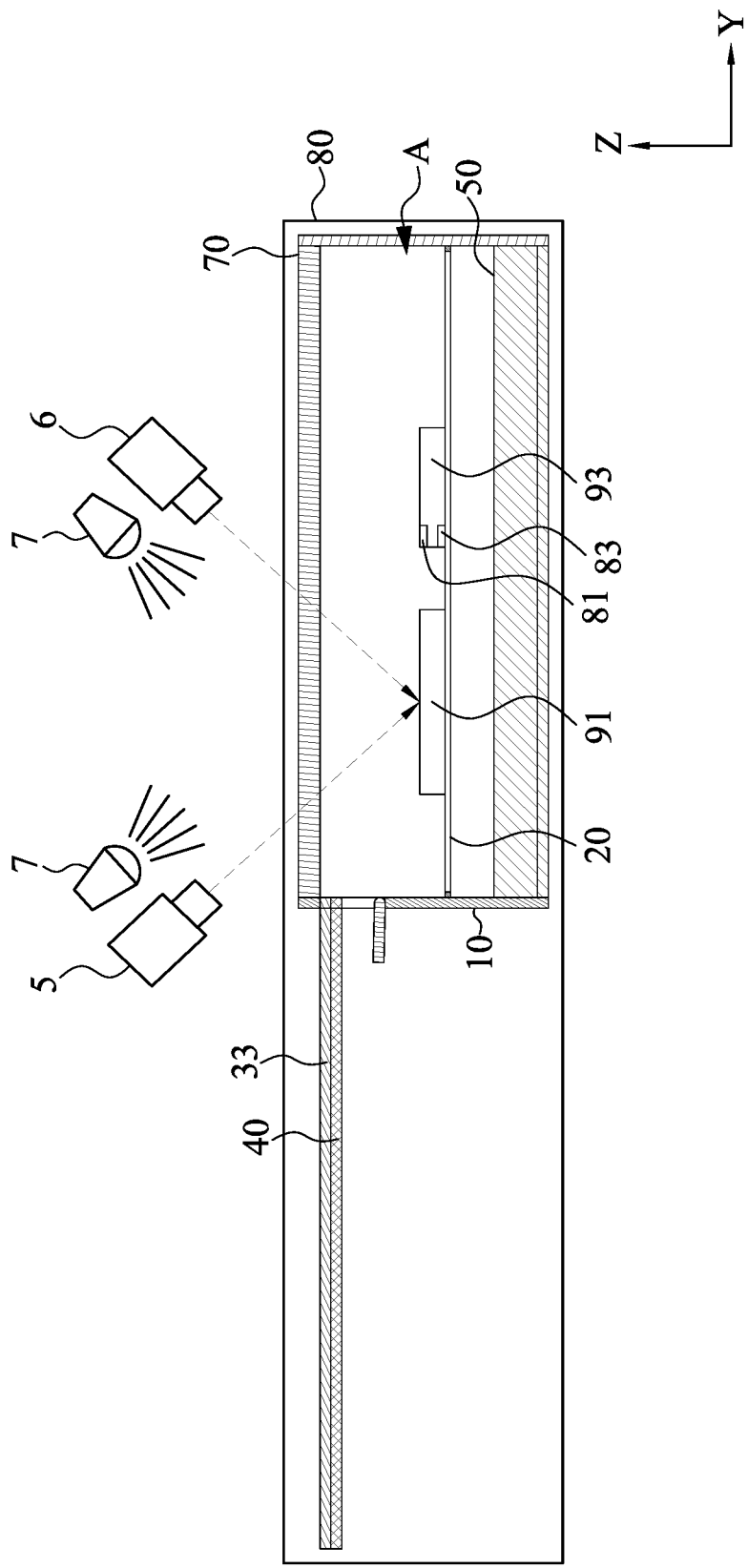
Figure 5B:
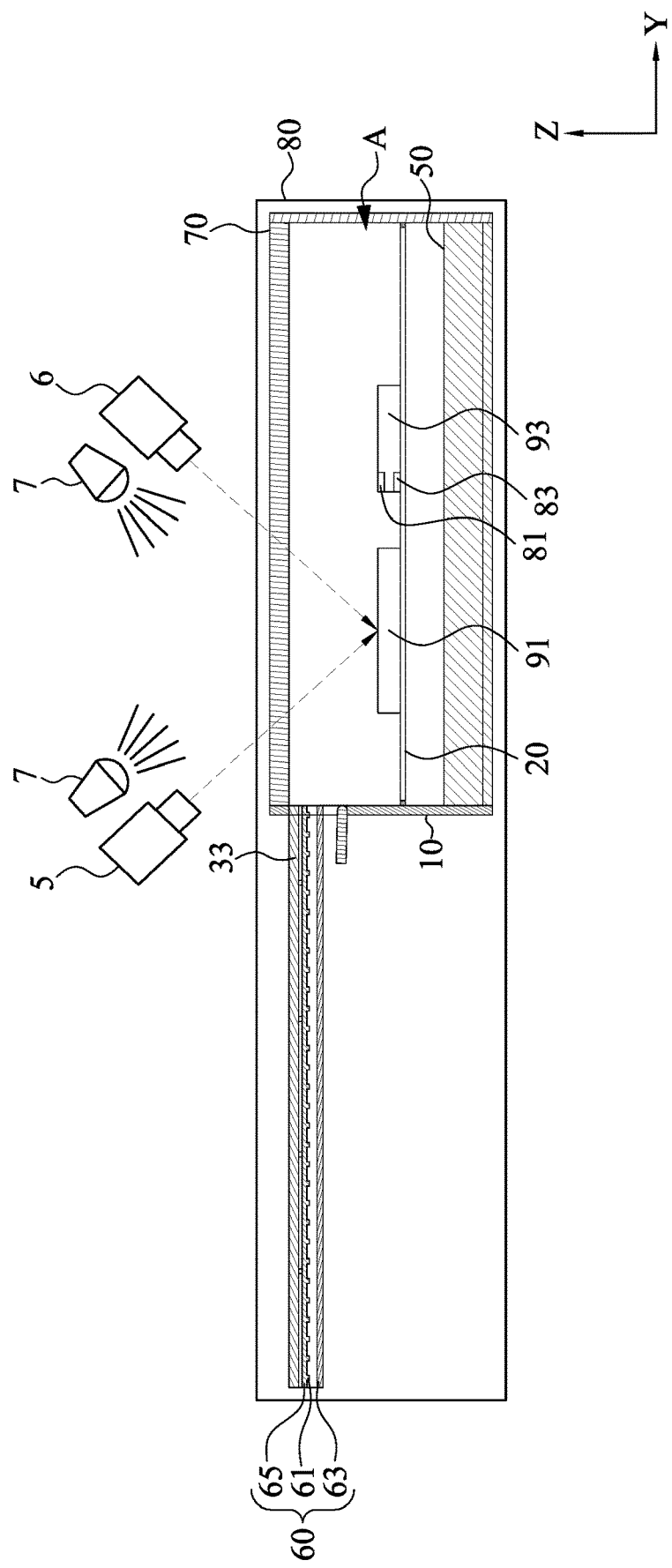

FIG. 4A, FIG. 4B, FIG. 5A and FIG. 5B illustrate various operations in a method for deformation measurement in accordance with some embodiments of the present disclosure. FIG. 4A and FIG. 5A demonstrate operation sequences of restoring and removing the heating device 40 from the position projecting over the sample 91 during a heating period and a measurement period, respectively. FIG. 4B and FIG. 5B demonstrate operation sequences of restoring and removing the cooling device 60 from the position projecting over the sample 91 during a cooling period and a measurement period, respectively.

Referring to FIG. 4A and FIG. 4B, a sample 91 is placed on a sample holder 20 in a housing 10. In some embodiments, the housing 10 may be disposed in a casing 80, and the optical sensor units 5 and 6 and the light source 7 are disposed outside the casing 80. In some embodiments, a portion of the casing 80 is transparent to a peak wavelength emitted or to be received by an image sensor (e.g., the optical sensor unit 5 and/or the optical sensor unit 6) outside the casing 80. In some embodiments, the sample 91 is then heated with a heating device 40 over the sample holder 20 and a heating device 50 below the sample holder 20 until a temperature of the sample 91 reaches a predetermined value. The predetermined value may be equal to or greater than room temperature. In some embodiments, a heating rate of the heating device 40 and a heating rate of the heating device 50 are adjusted so that the heating rates of the heating devices 40 and 50 are substantially the same.

In some embodiments, the heating device 40 heats the sample 91 through infrared radiation. In some embodiments, the heating device 40 and the heating device 50 heat the sample 91 by thermal conductance through air.

In some embodiments, a temperature sensor 81 and a temperature sensor 83 may be disposed on two opposite surfaces of a dummy sample 93 adjacent to the sample 91, and a power of at least one of the heating device 40 and the heating device 50 is adjusted according to temperatures sensed by the temperature sensor 81 and the temperature sensor 83, respectively.

In some other embodiments, instead of heating the sample 91 by the heating device 40 and 50, the sample 91 is cooled with a cooling device 60 over the sample holder 20 until a temperature of the sample 91 reaches a predetermined value. The predetermined value may be equal to or below 0° C.

Referring to FIG. 5A and FIG. 5B, after the temperature of the sample 91 reaches the predetermined value, in some embodiments, the heating device 40 is temporarily removed from the position projecting over the sample 91, and a first measurement is performed to a deformation of the sample 91 by an image sensor (e.g., the optical sensor unit 5 and/or the optical sensor unit 6) outside the housing 10. In some embodiments, the temperature of the sample 91 is maintained substantially equal to the predetermined value by the heating device 50 during the first measurement. In some embodiments, the heating device 40 is turned off prior to temporarily removing the heating device 40 from the position projecting over the sample 91.

In some embodiments, a portion of the sliding rail 31 (not shown in FIGS. 5A-5B) overlaps a portion of a cover 70 over the sample holder 20, while the support structure 33 does not overlap the cover 70 when the first measurement is performed to a deformation of the sample 91 by an image sensor. In some embodiments, the heating device 40 does not overlap the cover 70, while a portion of the sliding rail 31 (not shown in FIGS. 5A-5B) overlaps a portion of a cover 70 over the sample holder 20 when the first measurement is performed to a deformation of the sample 91 by an image sensor. In some embodiments, a length of the sliding rail 31 is greater than a length of the support structure 33 along the moving direction (e.g., the y-direction), such that the support structure 33 can be moved towards outside the measurement window (e.g., outside a portion of a projection of the cover 70). In some embodiments, the heating device 40 can be moved towards outside the measurement window (e.g., outside a portion of a projection of the cover 70) by the moving mechanism 30. In some embodiments, the measurement window refers to the range required for the image sensor to perform the deformation measurement. In some embodiments, the size of the measurement window is equal to or smaller than the size of the cover 70.

In some embodiments, the first measurement is performed by both of the optical sensor unit 5 (e.g., the local camera) and the optical sensor unit 6 (e.g., the global camera). In some embodiments, in the first measurement, a plurality of local images of a plurality of local areas of the sample 91 are captured by the optical sensor unit 5, and a global image of the sample 91 (e.g. of an entire surface of the sample 91) is captured by the optical sensor unit 6. In some embodiments, the first measurement is performed for about 2 minutes to about 3 minutes.

In some embodiments, as shown in FIG. 5B, the cooling device 60 is also temporarily removed from the position projecting over the sample 91. In some other embodiments, after the cooling device 60 is temporarily removed from the position projecting over the sample 91, the aforesaid first measurement is performed to a deformation of the sample 91 by an image sensor (e.g., the optical sensor unit 5 and/or the optical sensor unit 6) outside the housing 10. In some embodiments, a length of the sliding rail 31 is greater than a length of the support structure 33 along the moving direction (e.g., the y-direction), such that the cooling device 60 along with the support structure 33 can be moved towards outside the measurement window (e.g., outside a portion of a projection of the cover 70). In some embodiments, the cooling device 60 does not overlap the cover 70, while a portion of the sliding rail 31 (not shown in FIGS. 5A-5B) overlaps a portion of a cover 70 over the sample holder 20 when the first measurement is performed to a deformation of the sample 91 by an image sensor.

Next, referring back to FIG. 4A and FIG. 4B, the heating device 40 and the cooling device 60 are restored over the sample 91 subsequent to performing the first measurement.

In some embodiments, the heating device 40 is turned on after the heating device 40 is restored over the sample 91. The sample 91 is then heated with the heating device 40 over the sample holder 20 and the heating device 50 below the sample holder 20 until the temperature of the sample 91 reaches the predetermined value again.

In some other embodiments, the sample 91 is cooled by the cooling device 60 over the sample holder 20. In the embodiments, the sample 91 is cooled until a temperature of the sample 91 reaches another predetermine value.

Next, referring back to FIG. 5A and FIG. 5B, in some embodiments, the heating device 40 is temporarily removed from the position projecting over the sample 91, and a second measurement is performed to the deformation of the sample 91 by the image sensor (e.g., the optical sensor unit 5 and/or the optical sensor unit 6) outside the housing 10. In some embodiments, the temperature of the sample 91 is maintained substantially equal to the predetermined value by the heating device 50 during the second measurement.

In some other embodiments, the cooling device 60 is temporarily removed from the position projecting over the sample 91, and a second measurement is performed to the deformation of the sample 91 by the image sensor (e.g., the optical sensor unit 5 and/or the optical sensor unit 6) outside the housing 10.

In some embodiments, the second measurement is performed by the optical sensor unit 5 (e.g., the local camera). In some embodiments, the predetermined value of the temperature during the first measurement is substantially the same as the predetermined value of the temperature during the second measurement. In some embodiments, in the second measurement, a plurality of local images of a plurality of local areas of the sample 91 are captured by the optical sensor unit 5, while the global image of the sample 91 (e.g. of an entire surface of the sample 91) has been captured by the optical sensor unit 6 in the first measurement.

Next, the operation illustrated in FIGS. 4A-4B and the operation illustrated in FIGS. 5A-5B may be performed multiple times until adequate data has been collected for deformation measurement. In some embodiments, these multiple times of measurements are performed under the same predetermined temperature. In some embodiments, the sample 91 is cooled after the multiple times of measurement under the same predetermined temperature are performed.

Presented below are experimental results of exemplary embodiments to further show the properties and advantages of the apparatus for deformation measurement in accordance with some embodiments of the present disclosure. Table 1 shows experimental conditions and results of embodiments E1, E2 and C2. Embodiments E1 and E2 utilize the structure shown in FIG. 2, and embodiment C1 utilizes air ventilation units for heating and cooling. In table 1, "Front," "Middle" and "Back" indicates a location in the front of the test area, a location in the middle of the test area, and a location in the back of the test area, respectively.

Tables 2-3 show relationships between temperatures and warpage of a sample obtained by the deformation measurement described herein. Embodiments E3 and E4 utilize the structure shown in FIG. 2, and embodiments C2 and C3 utilize air ventilation units for heating and cooling. In the embodiments, the samples are substrates having speckles on the target surface thereof, and two cameras (i.e., optical sensor units) are used for speckles tracing to determine the deformation of the sample. The warpage of the sample is defined as the maximum elevational distance between two locations of the sample. In table 2, the unit of the warpage is in micrometer (μm). In table 3, the unit of the warpage is in millimeter (mm).

TABLE 2

| | Temperature (° C.) | | | | | | | |
|---|---|---|---|---|---|---|---|---|
| | 30 | 100 | 200 | 260 | 200 | 100 | 30 | 0 |
| E3 | 285 | 175 | 60 | −80 | 60 | 180 | 300 | 350 |
| C2 | 271.8 | 155.1 | 76.3 | −102.6 | 104.6 | 192.2 | 323.6 | NA |

| | Temperature (° C.) | | | | | | |
|---|---|---|---|---|---|---|---|
| | −20 | −10 | −65 | −40 | −20 | 0 | 30 |
| E3 | 390 | 415 | 455 | 435 | 415 | 380 | 335 |
| C2 | NA | NA | NA | NA | NA | NA | NA |

TABLE 1

| | Temperature range | Heating rate (° C./min) | Cooling rate (° C./min) | Test area (mm) | Temperature (° C.) | | | ΔT (° C.) |
|---|---|---|---|---|---|---|---|---|
| | | | | | Front | Middle | Back | |
| E1 | −65° C.-300° C. | 30 | 30 | 300 * 300 | 257 | 268 | 255 | 13 |
| E2 | −65° C.-300° C. | 30 | 30 | 600 * 600 | 251 | 266 | 255 | 15 |
| C1 | 25° C.-260° C. | 3-4 | 3-4 | 300 * 300 | 260 | 249 | 263.3 | 14.3 |

From the results shown in table 1, it is apparent that with the design of the heating devices 40 and 50 and the cooling device 60 in accordance with some embodiments of the present disclosure, the heating rate and the cooling rate of the apparatus are significantly greater than that of the structure using air ventilation units for heating and cooling. In addition, the uniformity of temperature distribution (ΔT) among a relatively large area (600*600 mm) in accordance with some embodiments of the present disclosure is comparative to that among a smaller area (300*300 mm).

TABLE 3

| | Temperature (° C.) | | | | | | | |
|---|---|---|---|---|---|---|---|---|
| | 25 | 100 | 200 | 250 | 200 | 100 | 25 | 0 |
| E4 | 6.25 | 1.20 | −1.57 | 0.74 | −0.65 | 2.40 | 10.65 | 14.35 |
| C3 | 8.23 | 0.80 | −1.08 | 1.75 | −0.25 | 2.55 | 11.21 | NA |

| | Temperature (° C.) | | | | | | |
|---|---|---|---|---|---|---|---|
| | −20 | −40 | −66 | −40 | −20 | 0 | 25 |
| E4 | 15.40 | 17.40 | 20.50 | 17.50 | 15.50 | 13.30 | 9.55 |
| C3 | NA | NA | NA | NA | NA | NA | NA |

The results in Tables 2 and 3 shown that with the design of the heating devices 40 and 50 and the cooling device 60 in accordance with some embodiments of the present disclosure, unlike the structure using air ventilation units for heating and cooling, the temperature variation can achieve a greater range, especially a temperature below zero degrees Celsius can be created for more versatile qualification tests.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An apparatus for deformation measurement, comprising:
    a housing;
    a sample holder in the housing;
    a moving mechanism over the sample holder;
    a first heating device on the moving mechanism;
    a second heating device below the sample holder; and
    a temperature sensor disposed adjacent to the sample holder and configured to control the first heating device and/or the second heating device, wherein the temperature sensor is configured to be disposed on a dummy sample proximal to a sample to be measured.

2. The apparatus of claim 1, wherein the sample holder comprises a plurality of bars arrange in parallel configured to carry a sample and expose a portion of the sample to the second heating device.

3. The apparatus of claim 1, wherein the moving mechanism includes:
    a sliding rail attached to the housing; and
    a support structure movably connected to the sliding rail, and the first heating device is coupled to the sliding rail.

4. The apparatus of claim 1, wherein the first heating device includes a plurality of heating tubes or a heating plate, and the second heating device includes a heating plate.

5. The apparatus of claim 1, further comprising:
    a cooling device disposed over the sample holder for providing liquid nitrogen to fill in the housing.

6. The apparatus of claim 1, further comprising:
    a cover disposed over the moving mechanism, wherein the cover is transparent to a peak wavelength emitted or to be received by an image sensor outside the housing.

7. The apparatus of claim 1, wherein the first heating device comprises a plurality of quartz tubes.

8. The apparatus of claim 1, wherein the second heating device is configured to maintain a temperature within the housing.

9. The apparatus of claim 2, wherein the sample holder is spaced apart from the second heating device.

10. The apparatus of claim 5, wherein the cooling device comprises:
    an outlet configured to provide the liquid nitrogen into the housing; and
    a collecting mechanism directly below the outlet, configured to collect the liquid nitrogen from the outlet and allow nitrogen vapor filling the housing.

11. The apparatus of claim 5, wherein the sample holder comprises a plurality of bars arranged in parallel and exposing a portion of a sample to the liquid nitrogen.

12. The apparatus of claim 1, wherein the temperature sensor comprises a first temperature sensor disposed on a top surface of the dummy sample facing the first heating device, and the first temperature sensor is configured to control a temperature of the first heating device.

13. The apparatus of claim 12, wherein the temperature sensor further comprises a second temperature sensor disposed on a bottom surface of the dummy sample facing the second heating device, and the second temperature sensor is configured to control a temperature of the second heating device.

14. The apparatus of claim 13, wherein the first temperature sensor and the second temperature sensor are configured to control a thermal distribution uniformity within the housing.

15. An apparatus for deformation measurement, comprising:
    a housing;
    a sample holder in the housing;
    a moving mechanism over the sample holder;
    a first heating device on the moving mechanism; and
    a second heating device below the sample holder;
    wherein the sample holder comprises a plurality of bars arrange in parallel configured to carry a sample and expose a portion of the sample to the second heating device; and
    wherein a distance between the adjacent bars is greater than a width of each of the bars.

16. An apparatus for deformation measurement, comprising:
    a housing;
    a sample holder in the housing:
    a moving mechanism over the sample holder, the moving mechanism comprising:
        a sliding rail attached to the housing; and
        a support structure movably connected to the sliding rail;
    a first heating device on the moving mechanism, wherein the first heating device is coupled to the sliding rail; and
    a second heating device below the sample holder;
    wherein a portion of the sliding rail overlaps a portion of a cover over the sample holder, wherein the cover is transparent to a peak wavelength emitted or to be received by an image sensor outside the housing.

17. An apparatus for deformation measurement, comprising:
    a housing;
    a sample holder in the housing;
    a moving mechanism over the sample holder;
    a first heating device on the moving mechanism;
    a second heating device below the sample holder; and
    a heat retardation plate, wherein the first heating device is between the sample holder and the heat retardation plate.

18. An apparatus for deformation measurement, comprising:
    a housing;
    a sample holder in the housing;
    a moving mechanism over the sample holder;
    a first heating device on the moving mechanism;
    a second heating device below the sample holder; and
    a cooling device disposed over the sample holder for providing liquid nitrogen to fill in the housing;
    wherein the cooling device comprises a plurality of tubes, each of the tubes including a plurality of outlets, and the outlets are disposed between quartz tubes of the first heating device.

* * * * *